United States Patent
Komatsuzaki et al.

(10) Patent No.: US 11,897,994 B2
(45) Date of Patent: Feb. 13, 2024

(54) URETHANE RESIN COMPOSITION AND MOISTURE-PERMEABLE FILM

(71) Applicant: DIC Corporation, Tokyo (JP)

(72) Inventors: Kunihiko Komatsuzaki, Osaka (JP); Yoshinori Kanagawa, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 17/639,590

(22) PCT Filed: Aug. 20, 2020

(86) PCT No.: PCT/JP2020/031386
§ 371 (c)(1),
(2) Date: Mar. 2, 2022

(87) PCT Pub. No.: WO2021/044852
PCT Pub. Date: Mar. 11, 2021

(65) Prior Publication Data
US 2022/0298290 A1  Sep. 22, 2022

(30) Foreign Application Priority Data
Sep. 6, 2019  (JP) ................. 2019-163017

(51) Int. Cl.
*C08G 18/42*  (2006.01)
*C08G 18/66*  (2006.01)
*C08G 18/76*  (2006.01)

(52) U.S. Cl.
CPC ..... *C08G 18/4238* (2013.01); *C08G 18/6637* (2013.01); *C08G 18/7692* (2013.01)

(58) Field of Classification Search
CPC ............ C08G 18/4238; C08G 18/6637
See application file for complete search history.

(56) References Cited

U.S. PATENT DOCUMENTS

| 2021/0087323 A1* | 3/2021 | Kawamura | ........ C08G 18/4854 |
| 2021/0115278 A1* | 4/2021 | Misaizu | ............. C08G 18/4238 |

FOREIGN PATENT DOCUMENTS

| EP | 2540908 | | 1/2013 | |
| EP | 2540908 A1 | * | 1/2013 | ............. C08G 18/10 |
| JP | 2018065940 | * | 4/2018 | ............. C08G 18/40 |
| WO | 2017104266 | | 6/2017 | |
| WO | WO-2017104266 A1 | * | 6/2017 | ............. B32B 27/40 |
| WO | 2019163622 | | 8/2019 | |

OTHER PUBLICATIONS

WO-2017104266_06-2017_English Translation.*
JP-2018065940_04-2018_English Translation.*
"International Search Report (Form PCT/ISA/210) of PCT/JP2020/031386," dated Nov. 2, 2020, with English translation thereof, pp. 1-6.
"Search Report of Europe Counterpart Application", dated Jul. 29, 2022, p. 1-p. 6.
Yijun Liu, "Polyurethane Raw Materials and Additives Manual", Apr. 30, 2005, pp. 225, with English translation thereof, Chemical Industry Press, Materials Science and Engineering Publishing Center, Beijing.
Ping Kong et al., "Plastic Material", Jul. 31, 2017, pp. 155-156, with English translation thereof, Guangdong Higher Education Press, Guangzhou.

* cited by examiner

*Primary Examiner* — Michael L Leonard
(74) *Attorney, Agent, or Firm* — JCIPRNET

(57) ABSTRACT

An object of the invention is to provide a urethane resin composition containing a biomass raw material and having excellent moisture permeability and excellent film strength. The invention provides a urethane resin composition containing a urethane resin (X), the urethane resin (X) containing, as essential raw materials, a polyol (A) that contains a polyol (a1) having an oxyethylene group, and a polyisocyanate (B), in which the polyol (A) further contains a polyester polyol (a2) containing a biomass-derived glycol (i) and a crystalline polybasic acid (ii) as raw materials, and the polyol (A) has a hydroxyl equivalent in a range of 400 g/eq to 600 g/eq. In addition, the invention provides a moisture-permeable film which is formed of the urethane resin composition.

6 Claims, No Drawings

URETHANE RESIN COMPOSITION AND MOISTURE-PERMEABLE FILM

CROSS-REFERENCE TO RELATED APPLICATION

This application is a 371 application of an international PCT application Ser. No. PCT/JP2020/031386, filed on Aug. 20, 2020, which claims the priority benefit of Japan application JP2019-163017, filed on Sep. 6, 2019. The entirety of the above-mentioned patent application is hereby incorporated by reference herein and made a part of this specification.

TECHNICAL FIELD

The present invention relates to a urethane resin composition and a moisture-permeable film.

BACKGROUND ART

A moisture permeable waterproof fabric having both moisture permeability and waterproofness is a structure in which a moisture-permeable film is bonded to a cloth via an adhesive, and as the moisture-permeable film, a urethane resin is generally used from the viewpoints of stretchability and processability.

As the moisture-permeable film, for example, a film made of the urethane resin by a wet film formation method, a non-porous film made of a hydrophilic urethane resin, and the like are used (see, for example, PLT 1). Further, as a problem of marine plastics attracts attention recently, a degree of attention to sustainable products aimed at breaking away from petroleum resources becomes high, and such a need is also increasing in urethane resins which are basically based on petroleum feedstock.

However, although various studies have been conducted on bio-base urethane resins for the moisture-permeable film, moisture permeability is still low and the resin is not a practical level.

CITATION LIST

Patent Literature

PTL 1: JP-A-2018-65940

SUMMARY OF INVENTION

Technical Problem

An object of the invention is to provide a urethane resin composition containing a biomass raw material and having excellent moisture permeability and excellent film strength.

Solution to Problem

The invention provides a urethane resin composition containing a urethane resin (X), the urethane resin (X) containing, as essential raw materials, a polyol (A) that contains a polyol (a1) having an oxyethylene group, and a polyisocyanate (B), in which the polyol (A) further contains a polyester polyol (a2) containing a biomass-derived glycol (i) and a crystalline polybasic acid (ii) as raw materials, and the polyol (A) has a hydroxyl equivalent in a range of 400 g/eq to 600 g/eq.

In addition, the invention provides a moisture-permeable film which is formed of the urethane resin composition.

Advantageous Effects of Invention

The urethane resin composition according to the invention contains a biomass raw material, and is an environment-friendly material. Further, the urethane resin composition according to the invention is excellent in moisture permeability and film strength, and thus can be particularly preferably used for producing a moisture-permeable film.

DESCRIPTION OF EMBODIMENTS

A urethane resin composition according to the invention is a urethane resin composition containing a urethane resin (X), the urethane resin (X) containing, as essential raw materials, a polyol (A) that contains a polyol (a1) having an oxyethylene group, and a polyisocyanate (B), in which the polyol (A) further contains a polyester polyol (a2) containing a biomass-derived glycol (i) and a crystalline polybasic acid (ii) as raw materials, and the polyol (A) has a hydroxyl equivalent in a range of 400 g/eq to 600 g/eq.

The polyol (a1) having an oxyethylene group is an indispensable material for obtaining excellent moisture permeability. As the polyol (a1), for example, polyoxyethylene polyol, polyoxyethylene polyoxypropylene polyol, and polyoxyethylene polyoxytetramethylene polyol can be used. These polyols may be used alone or in combination of two or more thereof. Among these, polyoxyethylene polyol is preferably used from the viewpoint that excellent moisture permeability can be obtained.

The number average molecular weight of the polyol (a1) is preferably in the range of 800 to 50,000, and more preferably in the range of 1,000 to 20,000, from the viewpoint of obtaining further excellent moisture permeability and film strength. The number average molecular weight of the polyol (a1) is a value measured by the gel permeation chromatography (GPC) method.

As the polyol (a1), a polyol produced from a biomass raw material can also be used, but at present, a polyol that is expensive and can be used in practice is extremely limited. Therefore, it is necessary to increase the biomass degree from raw materials other than this polyol (a1).

Therefore, in the invention, the biomass degree can be improved and excellent film strength can also be obtained by using, as the polyol (A), the polyol (a1) and the polyester polyol (a2) containing the biomass-derived glycol (i) and the crystalline polybasic acid (ii) as raw materials.

As the biomass-derived glycol (i), for example, ethylene glycol, 1,2-propanediol, 1,3-propanediol, 1,4-butanediol, 1,10-decanediol, dimerdiol, and isosorbide can be used. These compounds may be used alone or in combination of two or more thereof.

As the ethylene glycol, for example, a compound obtained from bioethanol obtained by a known method through ethylene can be used. As the 1,2-propanediol, for example, a compound obtained by fermentation of saccharides, and a compound obtained by high-temperature hydrogenation of glycerin produced as a by-product of biodiesel by a known method can be used. As the 1,3-propanediol, for example, a compound obtained by producing 3-hydroxypropionaldehyde from glycerol, glucose, and other saccharides by a known fermentation method, and then further converting to the 1,3-propanediol, and a compound directly obtained from glucose and other saccharides by a fermentation method can be used.

As the 1,4-butanediol, for example, a compound obtained from glucose by a known fermentation method, a compound obtained from 1,3-butadiene obtained by a fermentation method, and a compound obtained by hydrogenating succinic acid with a reduction catalyst can be used. As the 1,10-decanediol, for example, a compound obtained by hydrogenating sebacic acid directly or after an esterification reaction can be used. As the dimer diol, for example, a compound obtained by reducing a dimer acid by a known method can be used. As the isosorbide, for example, a compound obtained by dehydration condensation of sorbitol obtained from starch by a known method can be used.

Among the compounds described above, as the biomass-derived glycol (i), 1,3-propanediol and/or 1,4-butanediol are preferable, and 1,3-propanediol is more preferable, from the viewpoint of obtaining further excellent film strength.

As the crystalline polybasic acid (ii), for example, sebacic acid, succinic acid, 1,10-decanedicarboxylic acid, and 1,12-dodecanedicarboxylic acid can be used. As these polybasic acids, both a compound derived from petroleum resources and a compound derived from a biomass can be used. These compounds may be used alone or in combination of two or more thereof. Among these, a biomass-derived crystalline polybasic acid is preferably used from the viewpoint that the biomass degree can be improved. In the invention, "crystalline" means that a peak of heat of crystallization or heat of fusion can be observed in a differential scanning calorimetry (DSC) measurement based on JISK 7121:2012, and "amorphous" means that the peak cannot be observed.

As the sebacic acid, for example, a compound obtained by a known cleavage reaction of a vegetable oil such as castor oil with a caustic alkali can be used. As the succinic acid, for example, a compound obtained by fermenting corn, sugarcane, cassava, sago palm, or the like by a known method can be used. As the 1,10-decandicarboxylic acid, for example, a compound obtained by fermenting lauryl acid by a known method can be used. As the 1,12-dodecanedicarboxylic acid, for example, a compound obtained by fermenting myristic acid by a known method can be used.

Among the compounds described above, as the crystalline polybasic acid (ii), a compound selected from the group consisting of biomass-derived sebacic acid, succinic acid, 1,10-decanedicarboxylic acid, and 1,12-dodecanedicarboxylic acid is preferable, biomass-derived sebacic acid and/or succinic acid are more preferable, and biomass-derived sebacic acid is even more preferable, from the viewpoint of obtaining further excellent film strength.

The number average molecular weight of the polyester polyol (a2) is preferably in the range of 500 to 100,000, more preferably in the range of 700 to 50,000, and still more preferably in the range of 800 to 10,000, from the viewpoint of obtaining further excellent film strength. The number average molecular weight of the polyester polyol (a2) is a value measured by the gel permeation chromatography (GPC) method.

In addition to the above (a1) and (a2), a chain extender (a3) having a molecular weight of 40 to 500 is preferably used as the polyol (A) from the viewpoint of obtaining further excellent film strength. The molecular weight of the chain extender (a3) is a value calculated based on the chemical structural formula thereof.

As the chain extender (a3), for example, a chain extender having a hydroxy group such as ethylene glycol, diethylene glycol, triethylene glycol, propylene glycol, 1,3-propanediol, 1,3-butanediol, 1,4-butanediol, hexamethylene glycol, trimethylolpropane, and glycerin, and a chain extender having an amino group such as ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, hydrazine, diethylenetriamine, and triethylenetetramine can be used. Further, as the chain extender (a3), both a compound derived from petroleum resources and a compound derived from a biomass can be used. These chain extenders may be used alone or in combination of two or more thereof.

As the polyol (A), in addition to the above (a1), (a2), and (a3), other polyols may be used in combination in a range where the effect of the invention is not impaired.

As the other polyols, petroleum-derived polyester polyol, polyether polyol, polycarbonate polyol, polyacryl polyol, and polybutadiene polyol other than the above (a1) can be used. These polyols may be used alone or in combination of two or more thereof.

In the invention, it is essential that the polyol (A) has a hydroxyl equivalent in the range of 400 g/eq to 600 g/eq. The hydroxyl equivalent means a molecular weight per hydroxy group, the relevant range is a range in which the polyol (A) is relatively high among the raw materials constituting the urethane resin (X), and shows that there are relatively a few hard segments in the urethane resin (X). When the hydroxyl equivalent of the polyol (A) is within the relevant range, and when a specific polyol (A) is used, the biomass degree can be improved, and both excellent moisture permeability and excellent film strength can be obtained.

A use amount of the polyol (a1) having an oxyethylene group is preferably in the range of 10% by mass to 30% by mass, and more preferably in the range of 10% by mass to 20% by mass in a total amount of the raw materials constituting the urethane resin (X).

A use amount of the polyester polyol (a2) is preferably in the range of 40% by mass to 70% by mass, and more preferably in the range of 50% by mass to 60% by mass in the total amount of the raw materials constituting the urethane resin (X).

When the chain extender (a3) is used, a use amount thereof is preferably in the range of 2% by mass to 6% by mass, and more preferably in the range of 2% by mass to 4% by mass in the total amount of the raw materials constituting the urethane resin (X).

As the polyisocyanate (B), for example, an aromatic polyisocyanate such as polymethylene polyphenyl polyisocyanate, diphenylmethane diisocyanate, carbodiimide-modified diphenylmethane diisocyanate, xylylene diisocyanate, phenylene diisocyanate, tolylene diisocyanate, and naphthalene diisocyanate, and an aliphatic or alicyclic polyisocyanate such as hexamethylene diisocyanate, cyclohexane diisocyanate, isophorone diisocyanate, dicyclohexylmethane diisocyanate, and tetramethylxylylene diisocyanate can be used. Further, as the polyisocyanate (B), both a compound derived from petroleum resources and a compound derived from a biomass can be used. These polyisocyanates may be used alone or in combination of two or more thereof. Among these, an aromatic polyisocyanate is preferably used, and diphenylmethane diisocyanate is more preferable, from the viewpoint of obtaining further excellent film strength and moisture permeability.

A use amount of the polyisocyanate (B) is preferably in the range of 15% by mass to 25% by mass, and more preferably in the range of 17% by mass to 23% by mass in the total amount of the raw materials constituting the urethane resin (X).

As a method for producing the urethane resin (X), for example, a method in which the polyol (A) and the polyisocyanate (B) are charged at once and reacted with each other can be mentioned. The reaction is preferably carried out, for example, at a temperature of 30° C. to 100° C. for 3 to 10 hours. In addition, the reaction may be carried out in a solvent to be described later.

The molar ratio of an isocyanate group in the polyisocyanate (B) to the hydroxy group in the polyol (A) [(isocyanate group)/(hydroxy group and amino group)] is preferably in the range of 0.6 to 2, and more preferably in the range of 0.8 to 1.2.

The weight average molecular weight of the urethane resin (X) is preferably in the range of 10,000 to 1,000,000, more preferably in the range of 30,000 to 500,000, and still more preferably in the range of 50,000 to 100,000, from the viewpoint of obtaining further excellent film strength. The weight average molecular weight of the urethane resin (X) is a value measured by the gel permeation chromatography (GPC) method.

The biomass degree of the urethane resin (X) is preferably 40% or more, and more preferably in the range of 50% to 60%, from the viewpoint of achieving both excellent moisture permeability and excellent film strength. The biomass degree of the urethane resin (X) indicates a total weight ratio of the biomass-derived raw materials used in producing the urethane resin (X) with respect to a total weight of the urethane resin (X).

The urethane resin composition contains the urethane resin (X) as the essential component, and may contain other components as necessary.

As the other components, for example, a solvent, a pigment, a flame retardant, a plasticizer, a softening agent, a stabilizer, a wax, an antifoaming agent, a dispersant, a penetrant, a surfactant, a filler, an antifungal agent, an antibacterial agent, an ultraviolet absorber, an antioxidant, a weathering stabilizer, a fluorescent brightener, an antiaging agent, and a thickener can be used. These components may be used alone or in combination of two or more thereof.

As the solvent, for example, water, N,N-dimethylformamide, N,N-dimethylacetamide, ketone solvents such as N-methyl-2-pyrrolidone, methyl ethyl ketone, methyl-n-propyl ketone, acetone, and methyl isobutyl ketone, ester solvents such as methyl formate, ethyl formate, propyl formate, methyl acetate, ethyl acetate, propyl acetate, isopropyl acetate, butyl acetate, isobutyl acetate, and sec-butyl acetate, and alcohol solvents such as methanol, ethanol, isopropyl alcohol, and butanol can be used. These solvents may be used alone or in combination of two or more thereof.

The content of the solvent is preferably in the range of 10% by mass to 90% by mass, and more preferably in the range of 50% by mass to 80% by mass in the urethane resin composition, from the viewpoints of workability, viscosity, and film strength.

As described above, the urethane resin composition according to the invention contains a biomass raw material, and is an environment-friendly material. Further, the urethane resin composition according to the invention is excellent in moisture permeability and film strength, and thus can be particularly preferably used for producing a moisture-permeable film.

Next, a moisture-permeable film according to the invention will be described.

The moisture-permeable film is formed of the urethane resin composition.

As a method for forming the moisture-permeable film, for example, a method in which the urethane resin composition is applied onto a release paper and is dried at a temperature in, for example, the range of 40° C. to 150° C. for, for example, 1 to 30 minutes can be mentioned.

As a method for applying the composition onto the substrate surface, for example, a gravure coater method, a knife coater method, a pipe coater method, and a comma coater method can be mentioned.

The thickness of the moisture-permeable film can be determined depending on an application for which the moisture-permeable film is to be used, and is, for example, in the range of 0.01 mm to 10 mm.

As a method for producing a moisture permeable waterproof fabric when the moisture-permeable film according to the invention is used for producing the moisture permeable waterproof fabric, for example, a method for adhering the moisture-permeable film to a cloth using a known adhesive, and a method for directly applying the urethane resin composition onto a cloth and drying the cloth can be mentioned. As the cloth, for example, a cloth obtained from chemical fibers such as a polyester fiber, a nylon fiber, an acrylic fiber, a polyurethane fiber, an acetate fiber, a rayon fiber, and a polylactic acid fiber, and cotton, linen, silk, wool, and a blended fiber thereof can be used. When the urethane resin composition is directly applied onto a cloth, a dried product of the urethane resin composition is infiltrated into the cloth, and in the invention, such an embodiment is also referred to as a film.

EXAMPLES

Hereinafter, the invention will be described in more detail with reference to Examples.

Example 1

To a four-necked flask equipped with a thermometer, a stirrer, an inert gas inlet, and a reflux condenser, 120 parts by mass of a biomass polyester polyol (reactant of sebacic acid ("sebacic acid" manufactured by HOKOKU CORPORATION, hereinafter abbreviated as "Bio SEBA") and 1,3-propanediol ("SUSTERRA propanediol" manufactured by DuPont, hereinafter abbreviated as "Bio PD"), number average molecular weight: 2,000, hereinafter abbreviated as "Bio PEs (1)"), and 60 parts by mass of petroleum-based polyethylene glycol (number average molecular weight: 2,000, hereinafter abbreviated as "PEG (1)") were charged, dried under a reduced pressure at 110° C., and dehydrated until the water content was 0.05% by mass or less. Next, 6 parts by mass of petroleum-based ethylene glycol (hereinafter abbreviated as "EG") and 410 parts by mass of dimethylformamide were added. The temperature was cooled to 60° C., and then 47 parts by mass of diphenylmethane diisocyanate (hereinafter abbreviated as "MDI") was added thereto. The temperature was raised to 80° C., the reaction was continued for 4 hours, and then 0.5 parts by mass of Bio PD and 130 parts by mass of methyl ethyl ketone were added thereto. The reaction was stopped, and a urethane resin composition having a viscosity at 25° C. of 30,000 mPa·s was obtained.

Example 2

A urethane resin composition having a viscosity at 25° C. of 30,000 mPa.s was obtained in the same manner as in Example 1 except that a biomass polyester polyol (reactant of Bio SEBA and 1,4-butanediol ("Bio-BDO" manufactured by Genomatica, hereinafter abbreviated as "Bio BG"), number average molecular weight: 2,000, hereinafter abbreviated as "Bio PEs (2)") was used instead of the Bio PEs (1).

Example 3

To a four-necked flask equipped with a thermometer, a stirrer, an inert gas inlet, and a reflux condenser, 120 parts by mass of the "Bio PEs (1)" and 60 parts by mass of petroleum-based polyethylene glycol (number average molecular weight: 8,000, hereinafter abbreviated as "PEG (2)") were charged, dried under a reduced pressure at 110° C., and dehydrated until the water content was 0.05% by mass or less. Next, 7.5 parts by mass of petroleum-based ethylene glycol (hereinafter abbreviated as "EG") and 410 parts by mass of dimethylformamide were added. The temperature was cooled to 60° C., and then 47 parts by mass of diphenylmethane diisocyanate (hereinafter abbreviated as "MDI") was added thereto. The temperature was raised to 80° C., the reaction was continued for 4 hours, and then 0.5 parts by mass of Bio PD and 130 parts by mass of methyl ethyl ketone were added thereto. The reaction was stopped, and a urethane resin composition having a viscosity at 25° C. of 30,000 mPa·s was obtained.

Comparative Example 1

To a four-necked flask equipped with a thermometer, a stirrer, an inert gas inlet, and a reflux condenser, 120 parts by mass of the Bio PEs (1) and 60 parts by mass of the PEG (1) were charged, dried under a reduced pressure at 110° C., and dehydrated until the water content was 0.05% by mass or less. Next, 19 parts by mass of EG and 530 parts by mass of dimethylformamide were added, the temperature was cooled to 60° C., and then 99 parts by mass of MDI was added thereto. The temperature was raised to 80° C., the reaction was continued for 4 hours, and then 0.5 parts by mass of Bio PD and 165 parts by mass of methyl ethyl ketone were added thereto. The reaction was stopped, and a urethane resin composition having a viscosity at 25° C. of 30,000 mPa·s was obtained.

Comparative Example 2

To a four-necked flask equipped with a thermometer, a stirrer, an inert gas inlet, and a reflux condenser, 120 parts by mass of castor oil diol ("PH-5002" manufactured by Itoh Oil Chemicals Co., Ltd., number average molecular weight: 2,600) and 60 parts by mass of the PEG (1) were charged, dried under a reduced pressure at 110° C., and dehydrated until the water content was 0.05% by mass or less. Next, 6.8 parts by mass of EG and 410 parts by mass of dimethylformamide were added, the temperature was cooled to 60° C., and then 47 parts by mass of MDI was added thereto. The temperature was raised to 80° C., the reaction was continued for 4 hours, and then 0.5 parts by mass of Bio PD and 130 parts by mass of methyl ethyl ketone were added thereto. The reaction was stopped, and a urethane resin composition having a viscosity at 25° C. of 30,000 mPa·s was obtained.

[Method for Measuring Number Average Molecular Weight]

The number average molecular weights of the polyol and the like and the weight average molecular weight of the urethane resin (X) used in Examples and Comparative Examples are values measured by the gel permeation chromatography (GPC) method under the following conditions.

Measurement device: high-speed GPC device ("HLC-8220GPC" manufactured by Tosoh Corporation)

Column: the following columns manufactured by Tosoh Corporation were used in the manner of being connected in series.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (differential refractometer)
Column temperature: 40° C.
Eluent: tetrahydrofuran (THF)
Flow rate: 1.0 mL/min
Injection amount: 100 μL (tetrahydrofuran solution having a sample concentration of 0.4% by mass)
Standard sample: a calibration curve was created using the following standard polystyrenes.

(Standard Polystyrene)

"TSKgel standard polystyrene A-500" manufactured by Tosoh Corporation
"TSKgel standard polystyrene A-1000" manufactured by Tosoh Corporation
"TSKgel standard polystyrene A-2500" manufactured by Tosoh Corporation
"TSKgel standard polystyrene A-5000" manufactured by Tosoh Corporation
"TSKgel standard polystyrene F-1" manufactured by Tosoh Corporation
"TSKgel standard polystyrene F-2" manufactured by Tosoh Corporation
"TSKgel standard polystyrene F-4" manufactured by Tosoh Corporation
"TSKgel standard polystyrene F-10" manufactured by Tosoh Corporation
"TSKgel standard polystyrene F-20" manufactured by Tosoh Corporation
"TSKgel standard polystyrene F-40" manufactured by Tosoh Corporation
"TSKgel standard polystyrene F-80" manufactured by Tosoh Corporation
"TSKgel standard polystyrene F-128" manufactured by Tosoh Corporation
"TSKgel standard polystyrene F-288" manufactured by Tosoh Corporation
"TSKgel standard polystyrene F-550" manufactured by Tosoh Corporation

[Method of Producing Moisture-Permeable Film]

A blended liquid obtained by diluting one of the urethane resin compositions obtained in Examples and Comparative Examples with 30 parts by mass of dimethylformamide was applied onto a release paper and dried at 70° C. and 120° C. to obtain a moisture-permeable film.

[Method of Evaluating Moisture Permeability]

The moisture permeability (g/m$^2$/24 h) of each of the obtained moisture-permeable films was measured according to a B-1 method (potassium acetate method) of JIS L1099: 2012, and was evaluated as follows.

"T": 20,000 g/m$^2$/24 h or more.
"F": less than 20,000 g/m$^2$/24 h.

[Method of Evaluating Film Strength]

Each of the obtained moisture-permeable films was cut into a strip having a width of 5 mm and a length of 50 mm, pulled using a tensile tester "Autograph AG-I" (manufactured by Shimadzu Corporation) under the condition of a crosshead speed of 10 mm/sec under the atmosphere of a temperature of 23° C., and the 100% modulus (MPa) value of the test piece was measured. The chuck-to-chuck distance at this time was set to 40 mm. Based on the obtained 100% modulus value, the film strength was evaluated as follows.

"T": 2 MPa or more.
"F": less than 2 MPa.

TABLE 1

| Table | | Example 1 | Example 2 | Example 3 | Comparative Example 1 | Comparative Example 2 |
|---|---|---|---|---|---|---|
| Polyol (a1) having oxyethylene group | | PEG (1) | PEG (1) | PEG (2) | PEG (1) | PEG (1) |
| Polyester polyol (a2) | | Bio PEs (1) | Bio PEs (2) | Bio PEs (1) | Bio PEs (1) | Bio PEs (1) |
| | Glycol (i) | Bio PD | Bio BG | Bio PD | Bio PD | Castor oil diol |
| | Crystalline polybasic acid (ii) | Bio SEBA | Bio SEBA | Bio SEBA | Bio SEBA | |
| Chain extender (a3) | | EG Bio PD | EG Bio PD | EG Bio PD | EG Bio PD | EG Bio PD |
| Hydroxyl equivalent weight (g/eq.) of polyol (A) | | 500 | 500 | 500 | 250 | 500 |
| Polyisocyanate (B) | | MDI | MDI | MDI | MDI | MDI |
| Biomass degree (%) | | 52 | 52 | 52 | 40 | 52 |
| Evaluation on moisture permeability | Moisture permeability (g/m$^2$/24 h) based on B-1 | 40,000 | 30,000 | 60,000 | 10,000 | 20,000 |
| | Evaluation | T | T | T | F | T |
| Evaluation on film strength | 100% M (MPa) | 4.8 | 5.2 | 4 | 7 | 1.5 |
| | Evaluation | T | T | T | T | F |

It was found that the urethane resin composition according to the invention contained a biomass raw material and has excellent moisture permeability and excellent film strength.

On the other hand, Comparative Example 1 was an aspect in which the hydroxyl equivalent of the polyol (A) was below the range defined in the invention, and the moisture permeability was poor.

Comparative Example 2 was an aspect in which the castor oil diol was used instead of the polyester polyol (a2), and the film strength was poor.

The invention claimed is:

1. A urethane resin composition comprising:
   a urethane resin (X) containing, as essential raw materials, a polyol (A) that contains a polyol (a1) having an oxyethylene group, and a polyisocyanate (B), wherein
   the polyol (A) further contains a polyester polyol (a2) containing a biomass-derived glycol (i) and a crystalline polybasic acid (ii) as raw materials,
   the polyol (A) further contains a chain extender (a3), and
   the polyol (A) has a hydroxyl equivalent in a range of 400 g/eq to 600 g/eq,
   an amount of the polyol (a1) having an oxyethylene group is in a range of 10% by mass to 30% by mass in a total amount of the raw materials constituting the urethane resin (X),
   an amount of the polyester polyol (a2) is a the range of 40% by mass to 70% by mass in the total amount of the raw materials constituting the urethane resin (X),
   an amount of the chain extender (a3) is in a range of 2% by mass to 6% by mass in the total amount of the raw materials constituting the urethane resin (X),
   an amount of the polyisocyanate (B) is in a range of 15% by mass to 25% by mass in the total amount of the raw materials constituting the urethane resin (X).

2. The urethane resin composition according to claim 1, wherein the biomass-derived glycol (i) is 1,3-propanediol and/or 1,4-butanediol.

3. The urethane resin composition according to claim 1, wherein the crystalline polybasic acid (ii) is derived from a biomass.

4. The urethane resin composition according to claim 3, wherein the biomass-derived crystalline polybasic acid is one or more compounds selected from the group consisting of sebacic acid, succinic acid, 1,10-decanedicarboxylic acid, and 1,12-dodecanedicarboxylic acid.

5. The urethane resin composition according to claim 1, which has a biomass degree of 50% or more.

6. A moisture-permeable film comprising:
   the urethane resin composition according to claim 1.

\* \* \* \* \*